United States Patent
Matsuo et al.

(10) Patent No.: US 7,221,129 B2
(45) Date of Patent: May 22, 2007

(54) SWITCHING REGULATOR AND METHOD FOR CHANGING OUTPUT VOLTAGES THEREOF

(75) Inventors: Masahiro Matsuo, Hyogo-ken (JP); Tomonari Katoh, Osaka-fu (JP)

(73) Assignee: Ricoh Company, Ltd., Tokyo (JP)

( * ) Notice: Subject to any disclaimer, the term of this patent is extended or adjusted under 35 U.S.C. 154(b) by 203 days.

(21) Appl. No.: 11/115,342

(22) Filed: Apr. 27, 2005

(65) Prior Publication Data
US 2005/0258811 A1 Nov. 24, 2005

(30) Foreign Application Priority Data
Apr. 27, 2004 (JP) ............................. 2004-131607

(51) Int. Cl.
G05F 1/00 (2006.01)
G05F 1/613 (2006.01)
(52) U.S. Cl. .................. 323/222; 323/282; 323/284
(58) Field of Classification Search ................ 323/222, 323/282, 284
See application file for complete search history.

(56) References Cited

U.S. PATENT DOCUMENTS 5,912,552 A * 6/1999 Tateishi ...................... 323/285
RE37,609 E * 3/2002 Bittner ........................ 323/272
6,396,250 B1 * 5/2002 Bridge ......................... 323/283
6,642,697 B2 * 11/2003 Zuniga et al. ............... 323/223
6,933,706 B2 * 8/2005 Shih ............................ 323/222
6,940,189 B2 * 9/2005 Gizara ......................... 307/151
7,031,174 B2 * 4/2006 Lipcsei ......................... 363/98
7,061,213 B2 * 6/2006 Yoshida ....................... 323/224

FOREIGN PATENT DOCUMENTS

JP 2002-300774 10/2002

* cited by examiner

Primary Examiner—Bao Q. Vu
(74) Attorney, Agent, or Firm—Dickstein Shapiro LLP

(57) ABSTRACT

A switching regulator including two switching elements and a control switching part. The two switching elements perform a switching operation according to a control signal to control an output voltage. One of the two switching elements is larger in ON-resistance and smaller in control electrode capacitance than the other. The control switching part performs PFM control over the one of the two switching elements to output a first predetermined voltage in a first operation mode, performs PWM control over the two switching elements to output a second predetermined voltage higher than the first predetermined voltage in a second operation mode, and switches the first operation mode to the second operation mode by performing the PFM control, changing the first predetermined voltage to the second predetermined voltage, and switching the PFM control to the PWM control after a first predetermined time elapses since start of increase in the output voltage.

16 Claims, 4 Drawing Sheets

SWITCHING REGULATOR AND METHOD FOR CHANGING OUTPUT VOLTAGES THEREOF

FIELD OF THE INVENTION

The invention relates to a switching regulator and its method for changing an output voltage used in such devices as mobile devices, and particularly to a switching regulator and its method for changing an output voltage and reducing an overshoot voltage generated when the output voltage is increased.

BACKGROUND OF THE INVENTION

In recent years, there has been a demand for energy conservation to protect the environment. In the manufacture of battery-driven devices such as mobile phones and digital cameras, increased importance is placed on the reduction of electricity consumed by the battery-driven devices in order to extend a battery life. For this reason, a non-insulative step-down switching regulator including an inductor (hereinafter referred to simply as switching regulator) is widely used as a power supply circuit because of high-efficiency and ability to be downsized. Although the switching regulator is highly efficient when connected to a rated load, the amount of current consumed by the switching regulator is relatively large. Therefore, when the device connected to the switching regulator is in a light-load driving mode such as a stand-by state and a sleep-mode state, the efficiency of the switching regulator is substantially reduced.

In light of the above, the Japanese Laid-Open Patent Publication No. 2002-300774, for example, discloses a method of reducing the electricity consumed in the switching regulator by switching from a PWM (pulse width modulation) control to a PFM (pulse frequency modulation) control in the light-load driving mode, so that the switching frequency decreases to improve the efficiency of the switching regulator in the light-load driving mode.

An exemplary background switching regulator according to the above disclosure is illustrated in FIG. 1. The switching regulator 100 of FIG. 1 includes a PWM control circuit (PWMC) 101, a PFM control circuit (PFMC) 102, a switching element 103 driven by the PWM control circuit 101, a switching element 104 driven by the PFM control circuit 102, an oscillation circuit (OSC) 105, an error amplifier circuit (EAC) 106, a reference voltage source 107, an inductor La, a diode Da, a capacitor Ca, and resistors Ra and Rb. The switching regulator 100 receives an input voltage from a direct current power source BAT and outputs an output voltage to a load LO.

In normal operation, the PFM control circuit 102 stops operation, and the PWM control circuit 101 operates to perform an ON/OFF control of the switching element 103. Meanwhile, in the light-load driving mode, the PWM control circuit 101 stops operation, and the PFM control circuit 102 operates to perform an ON/OFF control of the switching element 104.

Since a relatively large amount of current flows through the switching element 103, which is used when the PWM control is performed, the switching element 103 is designed to be increased in size to reduce an ON-resistance thereof. The increase in size of the switching element 103, however, also increases a gate capacitance thereof.

When the amount of current supplied to the load (hereinafter referred to as load current) is relatively large, efficiency loss of the switching regulator is mainly due to the ON-resistance of the switching element used in the switching regulator. On the other hand, when the amount of the load current is relatively small, the efficiency loss of the switching regulator is mainly caused by charging and discharging of the gate capacitance of the switching element used in the switching regulator. Therefore, the switching element 104 used under the PFM control is reduced in size to have a relatively large ON-resistance but a relatively small gate capacitance, so that the efficiency of the switching regulator is improved.

However, when the switching regulator is designed to change the output voltage output therefrom such that the output voltage is switched from a relatively low voltage value to a relatively high voltage value according to a voltage setting signal, an overshoot voltage is generated, as observed in FIG. 2. The overshoot voltage causes a change in the output voltage. In addition, the overshoot voltage is increased when a switching regulator having a relatively large ON-resistance is switched to a switching regulator having a relatively small ON-resistance.

Further, the light-load driving mode in which the load current is small in amount is, in many cases, the sleep-mode state or the stand-by state wherein a load circuit such as a CPU (central processing unit), which uses the switching regulator 100 as a power supply circuit thereof, is stopped in operation. In this light-load driving mode, an operating voltage for the load circuit may be reduced to be lower than an operating voltage applied in a normal driving mode. Therefore, it is common that the output voltage output from the switching regulator is lowered to reduce the load current.

When switching is made from the light-load driving mode to the normal driving mode, however, if a control mode of the switching regulator is switched from the PFM control to the PWM control, and at the same time, if the output voltage is changed from a relatively low voltage to a relatively high voltage, a relatively large overshoot voltage is generated, causing adverse affects on the CPU and other circuits.

BRIEF SUMMARY OF THE INVENTION

The invention provides a switching regulator. In one example, a switching regulator includes two switching elements and a control switching part. Each of the two switching elements is configured to perform a switching operation in accordance with a control signal input therein to control output of an output voltage. One of the two switching elements is larger in ON-resistance and smaller in control electrode capacitance than the other of the two switching elements. The control switching part is configured to perform pulse-frequency-modulation control over the one of the two switching elements to output a first predetermined voltage in a first operation mode, to perform pulse-width-modulation control over the two switching elements to output a second predetermined voltage higher than the first predetermined voltage in a second operation mode, and to switch the first operation mode to the second operation mode by performing the pulse-frequency-modulation control, increasing the output voltage from the first predetermined voltage to the second predetermined voltage, and switching the pulse-frequency-modulation control to the pulse-width-modulation control upon elapse of a first predetermined time after start of increase in the output voltage.

The invention further provides another switching regulator. In one example, this switching regulator includes an input terminal configured to receive an input voltage, and an output terminal configured to output a predetermined constant voltage as an output voltage to an external load. The switching regulator further includes first and second switching elements and a control switching part. The first switching element is configured to perform a switching operation in accordance with a second control signal input in a control electrode thereof to control output of the output voltage. The second switching element is configured to be larger in ON-resistance and smaller in control electrode capacitance than the first switching element, and to perform a switching operation in accordance with a first control signal input in a control electrode thereof to control output of the output voltage. The control switching part is configured to perform the pulse-frequency-modulation control over the second switching element to output a first predetermined voltage as the output voltage in a first operation mode, to perform the pulse-width-modulation control over the first and second switching elements to output a second predetermined voltage higher than the first predetermined voltage as the output voltage in a second operation mode, and to switch the first operation mode to the second operation mode by performing the pulse-frequency-modulation control, increasing the output voltage from the first predetermined voltage to the second predetermined voltage, and switching the pulse-frequency-modulation control to the pulse-width-modulation control upon elapse of a first predetermined time after start of increase in the output voltage.

The switching regulator may further include a dummy load configured to serve as a pseudo load through which a predetermined current flows. The control switching part may be configured to connect the dummy load to the output terminal for a second predetermined time upon elapse of the first predetermined time.

In the switching regulator, the control switching part may include a pulse-width-modulation control circuit, a pulse-frequency-modulation control circuit, a switching circuit, and a control circuit. The pulse-width-modulation control circuit may be configured to perform the pulse-width-modulation control over the first switching element, and the pulse-frequency-modulation control circuit may be configured to perform the pulse-frequency-modulation control over the second switching element. The switching circuit may be configured to control output of the first control signal from the pulse-frequency-modulation control circuit and the second control signal from the pulse-width-modulation control circuit to the control electrode of the second switching element. The control circuit may be configured to stop, in the first operation mode, operation of the pulse-width-modulation control circuit and cause the switching circuit to exclusively output the first control signal from the pulse-frequency-modulation control circuit to the second switching element. Further, the control circuit may be configured to operate, in the second operation mode, the pulse-width-modulation control circuit and cause the switching circuit to exclusively output the second control signal from the pulse-width-modulation control circuit to the second switching element. Furthermore, the control circuit may be configured to stop, in switching from the first operation mode to the second operation mode, the operation of the pulse-width-modulation control circuit, increase the output voltage from the first predetermined voltage to the second predetermined voltage while causing the switching circuit to exclusively output the first control signal from the pulse-frequency-modulation control circuit to the second switching element, and operate the pulse-width-modulation control circuit and cause the switching circuit to exclusively output the second control signal from the pulse-width-modulation control circuit to the second switching element upon elapse of the first predetermined time after the start of increase in the output voltage.

The switching regulator may further include a dummy load configured to serve as a pseudo load through which a predetermined current flows. The control circuit may be configured to connect the dummy load to the output terminal for a second predetermined time upon elapse of the first predetermined time.

In the switching regulator, a current flowing through the external load may be smaller in amount in the first operation mode than in the second operation mode.

In the switching regulator, the control switching part may extend the first predetermined time as a voltage difference between the first and second predetermined voltages increases.

In the switching regulator, the first and second switching elements, the pulse-frequency-modulation control circuit, the pulse-width-modulation control circuit, the switching circuit, and the dummy load may be integrated into a single integrated circuit.

The invention further provides a switching regulating method. In one example, a switching regulating method includes: providing a control switching part and two switching elements, one of the two switching elements being larger in ON-resistance and smaller in control electrode capacitance than the other of the two switching elements; causing each of the two switching elements to perform a switching operation in accordance with a control signal input therein to control output of an output voltage; causing, in a first operation mode, the control switching part to perform pulse-frequency-modulation control over the one of the two switching elements to output a first predetermined voltage; causing, in a second operation mode, the control switching part to perform pulse-width-modulation control over the two switching elements to output a second predetermined voltage higher than the first predetermined voltage; causing, in switching from the first operation mode to the second operation mode, the control switching part to perform the pulse-frequency-modulation control, increase the output voltage from the first predetermined voltage to the second predetermined voltage, and switch the pulse-frequency-modulation control to the pulse-width-modulation control upon elapse of a first predetermined time after start of increase in the output voltage.

The invention also provides another switching regulating method. In one example, this switching regulating method includes: providing an input terminal configured to receive an input voltage, and an output terminal configured to output a predetermined constant voltage as an output voltage to an external load; providing a control switching part and first and second switching elements, the second switching element being larger in ON-resistance and smaller in control electrode capacitance than the first switching element; causing the first switching element to perform a switching operation in accordance with a second control signal input in a control electrode thereof to control output of the output voltage; causing the second switching element to perform a switching operation in accordance with a first control signal input in a control electrode thereof to control output of the output voltage; causing the control switching part to perform, in a first operation mode, the pulse-frequency-modulation control over the second switching element to output a first predetermined voltage as the output voltage; causing the control switching part to perform, in a second operation mode, the pulse-width-modulation control over the first and second switching elements to output a second predetermined voltage higher than the first predetermined voltage as the output voltage; and causing the control switching part to perform, in switching from the first operation mode to the second operation mode, the pulse-frequency-modulation control, increase the output voltage from the first predetermined voltage to the second predetermined voltage, and switch the pulse-frequency-modulation control to the pulse-width-modulation control upon elapse of a first predetermined time after start of increase in the output voltage.

The switching regulating method may further include: providing a dummy load configured to serve as a pseudo load through which a predetermined current flows; and causing the control switching part to connect the dummy load to the output terminal for a second predetermined time upon elapse of the first predetermined time.

The switching regulating method may further include: forming the control switching part with a pulse-width-modulation control circuit, a pulse-frequency-modulation control circuit, a switching circuit, and a control circuit; causing the pulse-width-modulation control circuit to perform the pulse-width-modulation control over the first switching element; causing the pulse-frequency-modulation control circuit to perform the pulse-frequency-modulation control over the second switching element; causing the switching circuit to control output of the first control signal from the pulse-frequency-modulation control circuit and the second control signal from the pulse-width-modulation control circuit to the control electrode of the second switching element; causing the control circuit, in the first operation mode, to stop operation of the pulse-width-modulation control circuit and cause the switching circuit to exclusively output the first control signal from the pulse-frequency-modulation control circuit to the second switching element; causing the control circuit, in the second operation mode, to operate the pulse-width-modulation control circuit and cause the switching circuit to exclusively output the second control signal from the pulse-width-modulation control circuit to the second switching element, and causing the control circuit, in switching from the first operation mode to the second operation mode, to stop the operation of the pulse-width-modulation control circuit, increase the output voltage from the first predetermined voltage to the second predetermined voltage while causing the switching circuit to exclusively output the first control signal from the pulse-frequency-modulation control circuit to the second switching element, and operate the pulse-width-modulation control circuit and cause the switching circuit to exclusively output the second control signal from the pulse-width-modulation control circuit to the second switching element upon elapse of the first predetermined time after the start of increase in the output voltage.

The switching regulating method may further include providing a dummy load configured to serve as a pseudo load through which a predetermined current flows; and causing the control circuit to connect the dummy load to the output terminal for a second predetermined time upon elapse of the first predetermined time.

The switching regulating method may further include making an amount of current flowing through the external load smaller in the first operation mode than in the second operation mode.

The switching regulating method may further include causing the control switching part to extend the first predetermined time as a voltage difference between the first and second predetermined voltages increases.

The switching regulating method may further include integrating the first and second switching elements, the pulse-frequency-modulation control circuit, the pulse-width-modulation control circuit, the switching circuit, and the dummy load into a single integrated circuit.

BRIEF DESCRIPTION OF THE DRAWINGS

A more complete appreciation of the disclosure and many of the advantages thereof are readily obtained as the same becomes better understood by reference to the following detailed description when considered in connection with the accompanying drawings, wherein.

DETAILED DESCRIPTION OF THE INVENTION

Figure 1:
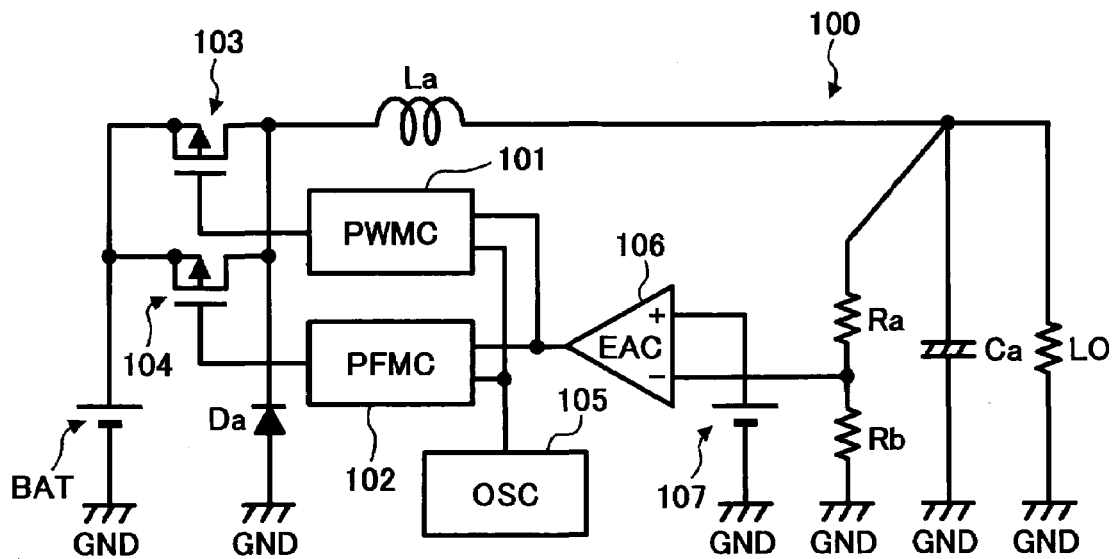
FIG. 1 is a circuit diagram illustrating a configuration of a background switching regulator.
Figure 2:
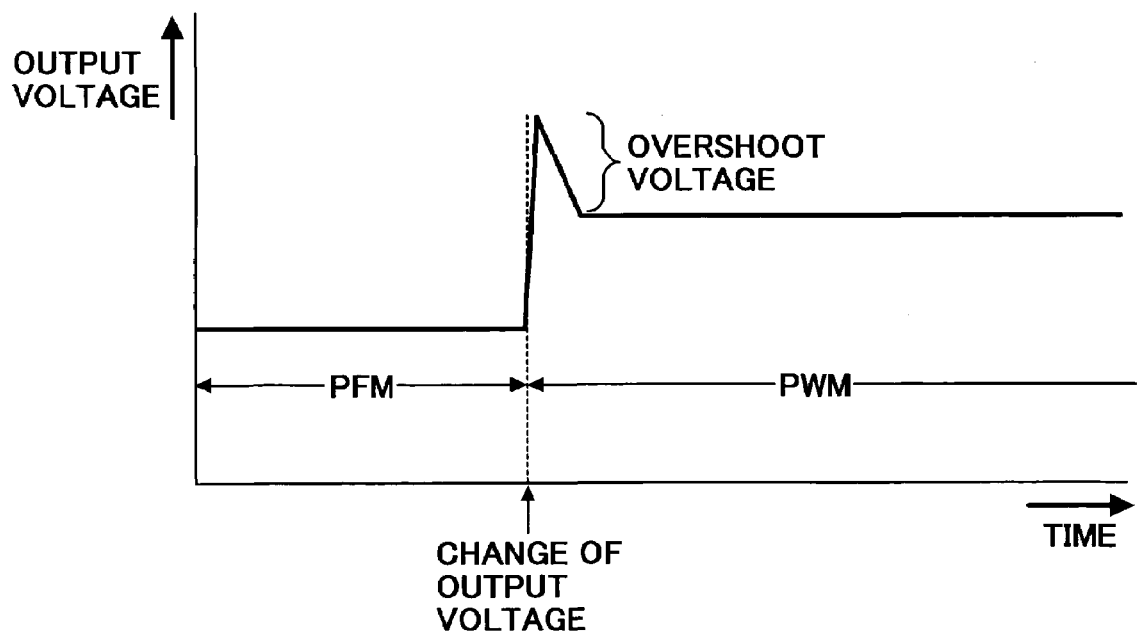
FIG. 2 is a timing diagram illustrating a waveform pattern of an output voltage output from the background switching regulator of FIG. 1 when a driving mode is switched from a light-load driving mode to a normal driving mode.

In describing preferred embodiments illustrated in the drawings, specific terminology is employed for the purpose of clarity. However, the disclosure of this patent specification is not intended to be limited to the specific terminology so used and it is to be understood that substitutions for each specific element can include any technical equivalents that operate in a similar manner.

Figure 3:
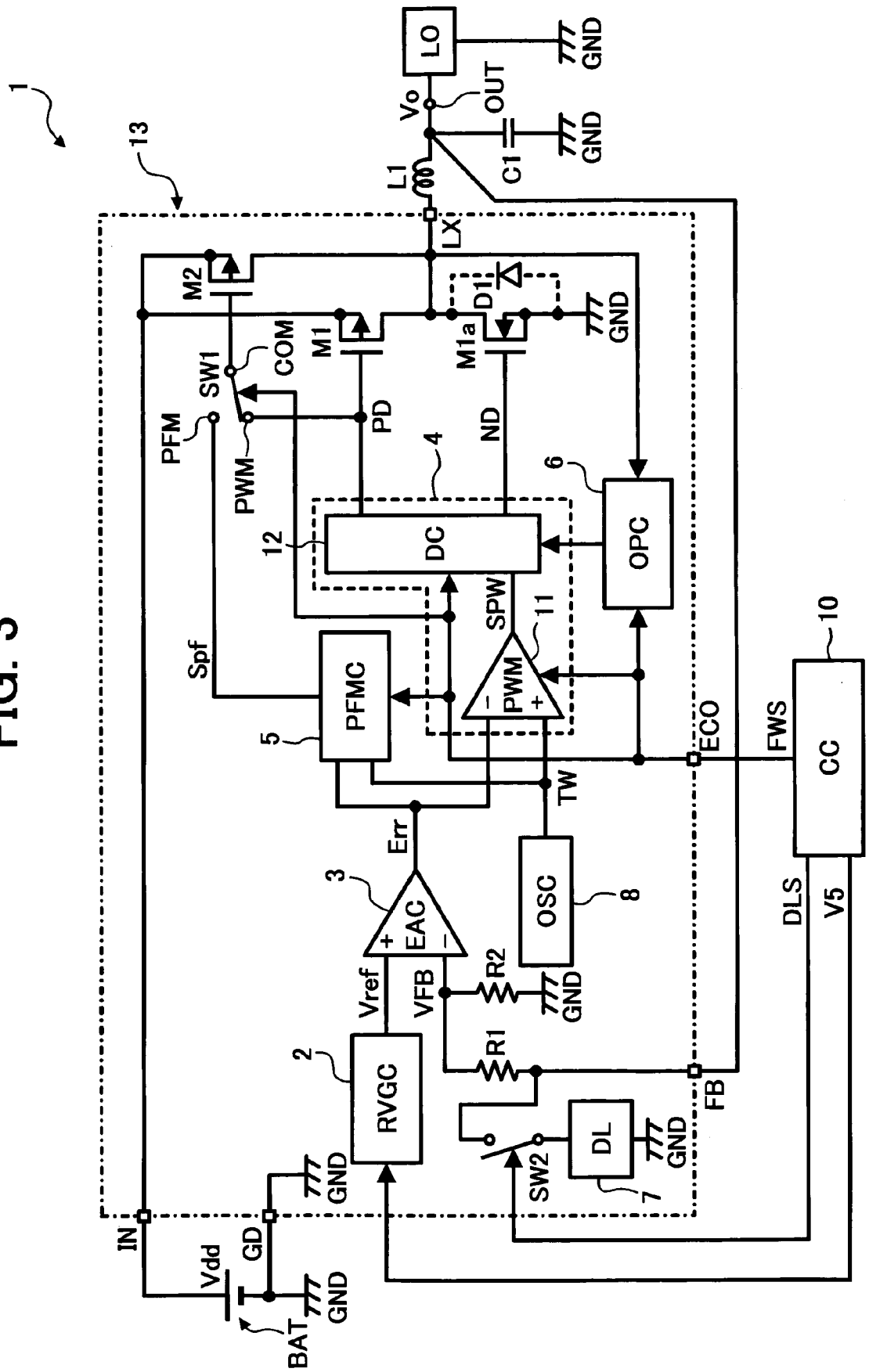
FIG. 3 is a circuit diagram illustrating a configuration of a switching regulator according to an embodiment of the invention.

Referring now to the drawings, wherein like reference numerals designate identical or corresponding parts throughout the several views, FIG. 3 illustrates a circuit diagram illustrating a configuration of a switching regulator according to an embodiment of the invention.

The switching regulator 1 of FIG. 3 includes an input terminal IN, an output terminal OUT, an inductor L1, a capacitor C1, a reference voltage generation circuit (RVGC) 2, an error amplifier circuit (EAC) 3, a PWM control circuit (PWMC) 4, a PFM control circuit (PFMC) 5, an overcurrent protection circuit (OPC) 6, a dummy load (DL) 7, an oscillation circuit (OSC) 8, a control circuit (CC) 10, a first switching element M1, a synchronous rectifying switching element M1a, a second switching element M2, a diode D1, output voltage detection resistors R1 and R2, a first switch SW1, a second switch SW2, and terminals LX, ECO, FB, and GD. The GD terminal is connected to the ground (GND). The PWM control circuit 4 includes a PWM circuit 11 (PWM) and a drive circuit (DC) 12. The first switch SW1 includes a common terminal COM which is connected to either one of a PFM terminal and a PWM terminal. In this switching regulator 1, the components as described above excluding the inductor L1, the capacitor C1, and the control circuit 10, are integrated into a single IC (integrated circuit) 13.

Connected to the load LO, the switching regulator 1 receives an input voltage Vdd input at the input terminal IN from the direct-current power source BAT, generates a predetermined constant voltage, and outputs the generated predetermined constant voltage from the output terminal OUT as an output voltage Vo.

The first switching element M1 is a PMOS (P-channel metal oxide semiconductor) transistor, which performs a switching operation to control output of the input voltage Vdd. The synchronous rectifying switching element M1a is an NMOS (N-channel metal oxide semiconductor) transistor, which performs a synchronous rectification operation. The second switching element M2 is a PMOS transistor, which is smaller in transistor size than the first switching element M1 and controls output of the input voltage Vdd. Further, the second switching element M2 is larger in the ON-resistance and smaller in the gate capacitance than the first switching element M1. The diode D1 parasitically resides between a source and a drain of the synchronous rectifier switching element M1a.

The inductor L1 and the capacitor C1 form a smoothing circuit. The resistors R1 and R2 divide the output voltage Vo to generate and output a divided voltage VFB to the error amplifier circuit 3. A connection point between the resistors R1 and R2 is connected to an inverting input terminal of the error amplifier circuit 3, while a reference voltage Vref is input at a non-inverting input terminal of the error amplifier circuit 3. The signal Err is output from the error amplifier circuit 3 to the PFM control circuit 5 and an inverting input terminal of the PWM circuit 11 which serves as a comparator.

The reference voltage generation circuit 2 generates the reference voltage Vref in accordance with a voltage setting signal VS input from the control circuit 10, and outputs the thus generated reference voltage Vref to the error amplifier circuit 3. Then, the error amplifier circuit 3 compares the reference voltage Vref with the divided voltage VFB, and outputs a signal Err having a voltage in accordance with a result of the comparison.

Based on the signal Err output from the error amplifier circuit 3, the PWM control circuit 4 performs the PWM control over the first switching element M1 and the synchronous rectifying switching element M1a so as to control switching thereof. Similarly, based on the signal Err output from the error amplifier circuit 3, the PFM control circuit 5 performs the PFM control over the second switching element M2.

As described above, the PWM control circuit 4 includes the PWM circuit 11 and the drive circuit 12. A triangular wave signal TW output from the oscillator circuit 8 is input in the PFM control circuit 5 and a non-inverting input terminal of the PWM circuit 11. Based on the signal Err output from the error amplifier circuit 3 and the triangular wave signal TW output from the oscillator circuit OSC 8, the PWM circuit 11 generates and outputs a pulse signal SPW, which is used in performing the PWM control. The pulse signal SPW output from the PWM circuit 11 is input in the drive circuit 12, and a pulse signal Spf output from the PFM control circuit 5 is input in the PPM terminal of the first switch SW1.

In accordance with the pulse signal SPW input from the PWM circuit 11, the drive circuit 12 generates a control signal PD, which is used in performing switching control of the first switching element M1, and a control signal ND, which is used in performing switching control of the synchronous rectifying switching element M1a. The control signal PD is input in a gate of the first switching element M1 and the PWM terminal of the first switch SW1, while the control signal ND is input in a gate of the synchronous rectifier switching element M1a. Accordingly, the switching elements M1 and M1a are operated, respectively.

The common terminal COM of the first switch SW1 is connected to a gate of the second switching terminal M2 so that the overcurrent protection current 6 monitors a current flowing through the terminal LX and outputs a result of the monitoring to the drive circuit 12.

The overcurrent protection circuit 6 detects a current flowing through the inductor L1 to determine whether the detected current exceeds a predetermined current amount to be an overcurrent. If the overcurrent protection circuit 6 determines that the detected current is the overcurrent, the overcurrent protection circuit 6 causes the PWM control circuit 4 to turn off the first switching element M1 and the synchronous rectifier switching element M1a. The dummy load 7 serves as a pseudo load through which a predetermined current is flowed. The oscillator circuit 8 generates the triangular wave signal TW having a predetermined frequency, and outputs the triangular signal TW to the PWM control circuit 4 and the PFM control circuit 5.

The control circuit 10 generates and outputs the voltage setting signal VS and switching signals FWS and DLS in accordance with a predetermined sequence. According to the switching signal FWS output from the control circuit 10, which instructs switching of an operation mode, either one of the control signal PD, which is output from the PWM control circuit 4 to the gate of the first switching element M1, and the pulse signal Spf, which is output from the PFM control circuit 5, is input in the gate of the second switching element M2 by the first switch SW1. The second switch SW2, on the other hand, controls connection of the dummy load 7 to the output terminal OUT.

The reference voltage generation circuit 2, the error amplifier circuit 3, the PWM control circuit 4, the PFM control circuit 5, the oscillation circuit 8, the resistors R1 and R2, the first and second switches SW1 and SW2, and the control circuit 10 form a control switching part.

The reference voltage generation circuit 2, the error amplifier circuit 3, the PWM control circuit 4, the oscillation circuit 8, and the resistors R1 and R2 form a PWM control part.

The reference voltage generation circuit 2, the error amplifier circuit 3, the PFM control circuit 5, the oscillation circuit 8, and the resistors R1 and R2 form a PFM control part.

The first switch SW1 forms a switching part, and the control circuit 10 and the second switch SW2 form a control part.

In the switching regulator 1 thus configured, the direct-current power source BAT is connected between the input terminal IN and the terminal GD so that the input voltage Vdd is input from the direct-current power source BAT to the input terminal IN. The load LO is connected between the output terminal OUT and the ground.

The first and second switching elements M1 and M2 are connected in parallel between the input terminal IN and the terminal LX. The synchronous rectifier switching element M1a is connected between the terminal LX and the ground. The inductor L1 is connected between the terminal LX and the output terminal OUT, and the capacitor C1 is connected between the output terminal OUT and the ground. A connection point between the inductor L1 and the capacitor C1, which is connected to the output terminal OUT, is connected to the terminal FB. A series circuit formed by the resistors R1 and R2 is connected between the terminal FB and the ground.

The switching signal FWS output from the control circuit 10 is input in the PFM control circuit 5, the overcurrent protection circuit 6, the PWM circuit 11, the drive circuit 12, and the first switch SW1. Further, the second switch SW2 and the dummy load 7 are connected in series between the terminal FB and the ground. The switching signal DLS output from the control circuit 10 is input in the second switch SW2, and the second switch SW2 performs switching operation in accordance with the switching signal DLS.

In the switching regulator 1 thus configured, the switching signal FWS is used for switching between the normal driving mode (i.e., a second operation mode) and the light-load driving mode (i.e., a first operation mode) in which the device connected to the switching regulator 1 is operated by a current smaller in amount than a current used in the normal driving mode.

The control circuit 10 measures the amount of a current flowing through the load LO. When the control circuit 10 determines that the current flowing through the load LO is below a predetermined current amount, the control circuit 10 may output the switching signal FWS to switch the driving mode to the light-load driving mode. Alternatively, the control circuit 10 may output the switching signal FWS when the device including the switching regulator 1 shifts to the stand-by state.

Description is now made on an operation performed in the switching regulator 1 when the normal driving mode is selected according to the switching signal FWS. In this case, operation of the PFM control circuit 5 is stopped, and the amount of currents consumed by the PFM control circuit 5 is reduced or minimized. At the same time, the PWM circuit 11, the drive circuit 12, and the overcurrent protection circuit 6 operate so that the switching regulator 1 operates as a synchronous rectifier switching regulator. Further, the first switch SW1 performs switching operation so as to connect the common terminal COM to the PWM terminal, and the control signal PD output from the drive circuit 12 is input in the gate of the second switching element M2.

The first and second switching elements M1 and M2 thus perform respective switching operations, and when the first and second switching elements M1 and M2 are turned on and the synchronous rectifier switching element M1a is turned off, the inductor L1 is supplied with a current. Meanwhile, when the first and second switching elements M1 and M2 are turned off, the synchronous rectifier switching element M1a is turned on, and energy stored in the inductor L1 is discharged through the synchronous rectifier switching element M1a. A current consequently generated is then smoothed by the capacitor C1 and output from the output terminal OUT to the load LO.

Further, the output voltage Vo output from the output terminal OUT is divided by the output voltage detection resistors R1 and R2, and the divided voltage VFB is input in the inverting input terminal of the error amplifier circuit 3. The reference voltage Vref is input in the non-inverting input terminal of the error amplifier circuit 3, and a difference in voltage between the divided voltage VFB and the reference voltage Vref is amplified by the error amplifier circuit 3 and output to the inverting input terminal of the PWM circuit 11. The triangular wave signal TW output from the oscillator circuit 8 is input in the non-inverting input terminal of the PWM circuit 11, and the PWM circuit 11 outputs the PWM-controlled pulse signal SPW to the drive circuit 12.

When the output voltage Vo output from the switching regulator 1 is increased, the signal Err output from the error amplifier circuit 3 decreases, so that a duty cycle of the pulse signal SPW output from the PWM circuit 11 is reduced. As a result, time during which the first and second switching elements M1 and M2 are in an ON state is shortened, so that the output voltage Vo output from the switching regulator 1 is controlled to be reduced. When the output voltage Vo output from the switching regulator 1 decreases, an inverse operation to the operation described above is performed. As a result, the output voltage Vo output from the switching regulator 1 is controlled to be constant.

Further, the overcurrent protection circuit 6 compares a predetermined voltage with each of voltage drops occurring in the first and second switching elements M1 and M2 while the first and second switching elements M1 and M2 are in the ON state. When the value of the voltage drop exceeds the predetermined voltage, the overcurrent protection circuit 6 outputs a predetermined signal to stop operation of the drive circuit 12. When the drive circuit 12 stops operation, the drive circuit 12 shifts a level of the control signal PD to a relatively high level and a level of the control signal ND to a relatively low level, so that the first and second switching elements M1 and M2 and the synchronous rectifier switching element M1a are turned off. Accordingly, supply of an output current from the output terminal OUT is stopped.

Description is then made on an operation performed in the switching regulator 1 when the light-load driving mode is selected according to the switching signal FWS. In this case, the PFM control circuit 5 is operated. Meanwhile, the PWM circuit 11, the drive circuit 12, and the overcurrent protection current 6 are stopped in operation, and currents consumed by the PWM circuit 11, the drive circuit 12, and the overcurrent protection current 6 are reduced or minimized. Further, the first switch SW1 performs a switching operation such that the common terminal COM is connected to the PFM terminal, and the PFM-controlled pulse signal Spf output from the PFM control circuit 5 is input in the gate of the second switching element M2. Then, the second switching element M2 performs a switching operation in accordance with the pulse signal Spf output from the PFM control circuit 5. In this state, the operation of the drive circuit 12 is stopped. Therefore, the synchronous rectifier switching element M1a stays in an OFF state. Accordingly, the energy stored in the inductor L1 is discharged via the diode D1, which parasitically resides between the source and the drain of the synchronous rectifier switching element M1a.

Figure 4A:
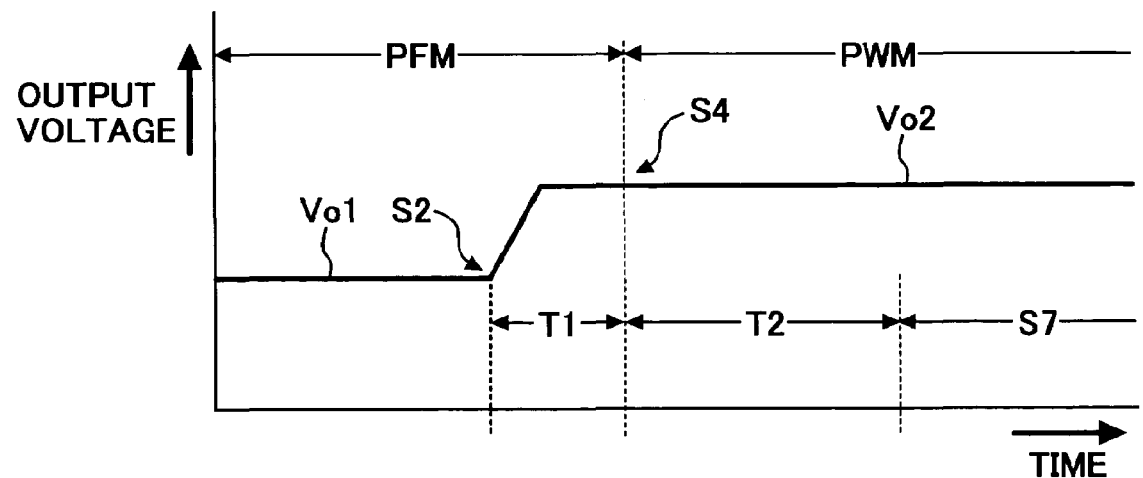
FIG. 4A is a timing diagram illustrating a waveform pattern of an output voltage output from the switching regulator of FIG. 3 when the driving mode is switched from the light-load driving mode to the normal driving mode.
Figure 4B:
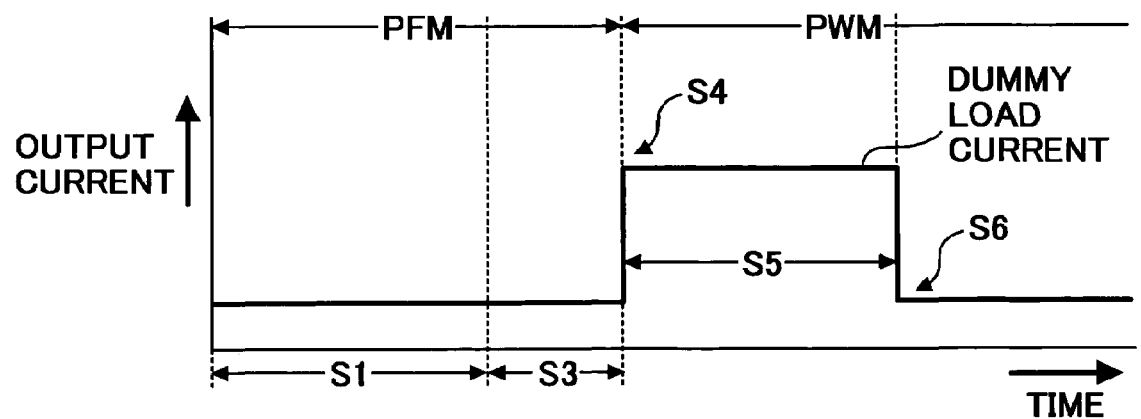
FIG. 4B is a timing diagram illustrating a waveform pattern of an output current output from the switching regulator of FIG. 3 when the driving mode is switched from the light-load driving mode to the normal driving mode.
Figure 5:
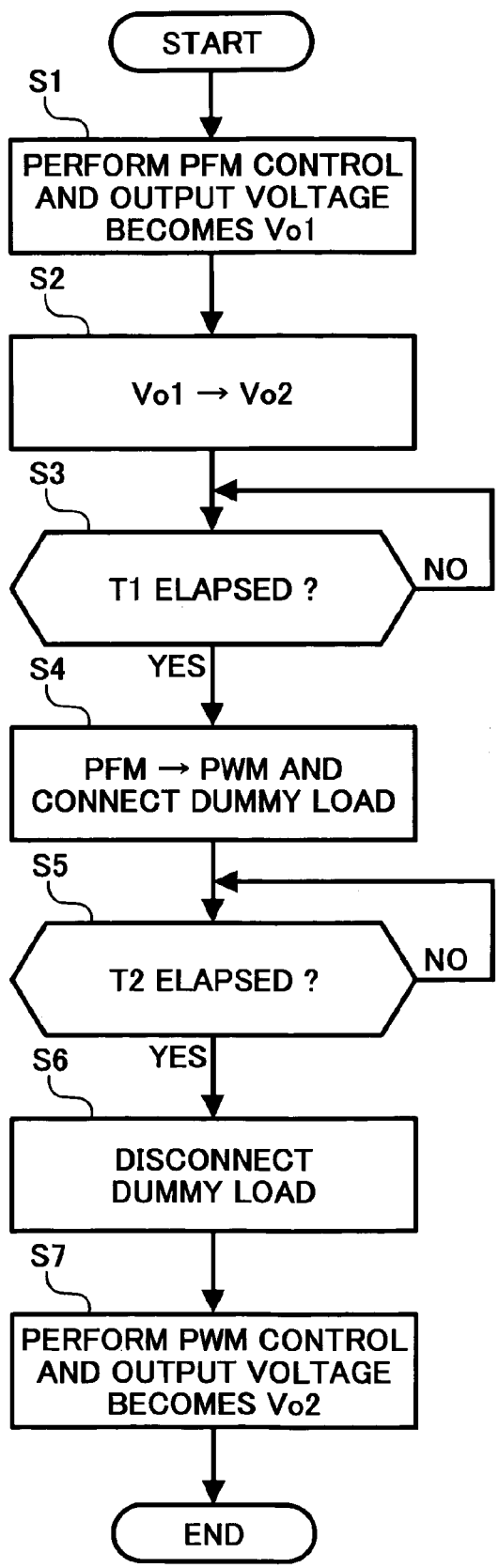
FIG. 5 is a flowchart illustrating an operation of a control circuit provided in the switching regulator of FIG. 3.

With reference to timing diagrams of FIGS. 4A and 4B and the flowchart of FIG. 5, description is made of an operation performed in the switching regulator 1 when the driving mode switches from the light-load driving mode to the normal driving mode. Steps S1 to S7 indicated in the time charts of FIGS. 4A and 4B correspond to Steps S1 to S7 of the flowchart of FIG. 5.

At Step S1, the light-load driving mode is selected. Therefore, the control circuit 10 sets the voltage value of the reference voltage Vref by sending the voltage setting signal VS to the reference voltage generation circuit 2 so that the output voltage Vo is equalized with a constant voltage Vo1. Further, the control circuit 10 issues the switching signal FWS to cause the switching regulator 1 to perform the PFM control, and issues the switching signal DLS to turn off the second switch SW2 and bring the second switch SW2 into non-conduction.

At Step S2, prior to cancellation of the light-load driving mode, the control circuit 10 sets the voltage value of the reference voltage Vref by sending the voltage setting signal VS to the reference voltage generation circuit 2 so that the output voltage Vo increases from the constant voltage Vo1 to a constant voltage Vo2. As a result, the output voltage Vo starts to increase from the constant voltage Vo1 to the constant voltage Vo2, as illustrated in FIG. 4A.

At Step S3, the control circuit 10 is in the stand-by state during a predetermined time period T1 in which the output voltage Vo completely reaches the constant voltage Vo2. The predetermined time period T1 may be a fixed value or may be changed in accordance with a difference voltage between the constant voltages Vo1 and Vo2.

At Step S4, after the predetermined time peiod T1 has elapsed, the control circuit 10 outputs the switching signal FWS to cause the switching regulator 1 to switch from the PFM control to the PWM control. Accordingly, the operation mode of the switching regulator 1 is changed to the PWM control. At the same time, the control circuit 10 outputs the switching signal DLS to turn on the second switch SW2 and bring the second switch SW2 into conduction. As a result, the second switch SW2 is turned on, and the dummy load 7 is connected between the output terminal OUT and the ground.

The dummy load 7 is thus connected for the following reasons. First, when the switching regulator 1 shifts from the PFM control to the PWM control, the load LO is not yet in the normal driving mode. Therefore, the amount of currents flowing through the load LO in this state is not substantially different from the amount of the currents flowing through the load LO in the light-load driving mode. That is, the amount of currents flowing through the load LO in the present state is substantially small. Further, even the reference voltage Vref stays unchanged, the output voltage Vo is slightly different between a state in which the PFM control is performed and a state in which the PWM control is performed. If the output voltage Vo output under the PFM control is higher, even only slightly, than the output voltage Vo output under the PWM control, the first and second switching elements M1 and M2 are both turned off immediately after the PFM control has switched to the PWM control.

Furthermore, since the currents flowing through the load Lo is substantially small, as described above, the output voltage Vo does not decrease quickly. Therefore, the PWM circuit 11 performs an abnormal operation such as a burst oscillation, and thus the voltage value of the output voltage Vo becomes unstable. To prevent such abnormal operation, the control circuit 10 connects the dummy load 7 to the output terminal OUT immediately after transition from the PFM control to the PWM control. Accordingly, the output voltage Vo is promptly decreased to the constant voltage Vo2 at which the PWM circuit 11 is normally operated, even when the output voltage Vo output under the PFM control is slightly higher than the output voltage Vo output under the PWM control.

At Step S5, the control circuit 10 keeps the second switch SW2 in an ON-state to keep the dummy load 7 connected to the output terminal OUT for a predetermined time period T2, which is longer than a time required for which normal operation of the PWM control circuit 4 has been ensured. After the predetermined time period T2 has elapsed (YES at Step S5), the control circuit 10 outputs the switching signal DLS to turn off the second switch SW2 and bring the second switch SW2 into non-conduction. Accordingly, the connection of the dummy load 7 to the output terminal OUT is cut off (Step S6). In this manner, the control circuit 10 completes a process of switching from the light-load driving mode to the normal driving mode. Accordingly, at Step S7, the switching regulator 1 performs the PWM control and the output voltage Vo is changed to the constant voltage Vo2.

As described above, in the switching regulator according to the present embodiment, when the driving mode switches from the light-load driving mode to the normal driving mode, the output voltage Vo is increased up to the predetermined voltage Vo2 under the PFM control, and the PFM control is switched to the PWM control after the output voltage Vo has reached the predetermined voltage Vo2. Accordingly, the switching regulator can supply the output voltage without generating the overshoot voltage.

The above-described embodiments are illustrative, and numerous additional modifications and variations are possible in light of the above teachings. For example, elements and/or features of different illustrative and exemplary embodiments herein may be combined with each other and/or substituted for each other within the scope of this disclosure and appended claims. It is therefore to be understood that within the scope of the appended claims, the disclosure of this patent specification may be practiced otherwise than as specifically described herein.

This application is based on and claims priority to Japanese patent application No. 2004-031607 filed on Apr. 27, 2004 in the Japan Patent Office, the entire contents of which are incorporated by reference herein.

What is claimed as new and desired to be protected by Letters Patent of the United States is:

1. A switching regulator comprising:

two switching elements each configured to perform a switching operation in accordance with a control signal input therein to control output of an output voltage, one of the two switching elements being larger in ON-resistance and smaller in control electrode capacitance than the other of the two switching elements; and a control switching part configured to perform pulse-frequency-modulation control over the one of the two switching elements to output a first predetermined voltage in a first operation mode, to perform pulse-width-modulation control over the two switching elements to output a second predetermined voltage higher than the first predetermined voltage in a second operation mode, and to switch the first operation mode to the second operation mode by performing the pulse-frequency-modulation control, increasing the output voltage from the first predetermined voltage to the second predetermined voltage, and switching the pulse-frequency-modulation control to the pulse-width-modulation control upon elapse of a first predetermined time after start of increase in the output voltage.

2. A switching regulator comprising:

an input terminal configured to receive an input voltage;

an output terminal configured to output a predetermined constant voltage as an output voltage to an external load;

a first switching element configured to perform a switching operation in accordance with a first control signal input in a control electrode thereof to control output of the output voltage;

a second switching element configured to be larger in ON-resistance and smaller in control electrode capacitance than the first switching element, and to perform a switching operation in accordance with a second control signal input in a control electrode thereof to control output of the output voltage; and a control switching part configured to perform the pulse-frequency-modulation control over the second switching element to output a first predetermined voltage as the output voltage in a first operation mode, to perform the pulse-width-modulation control over the first and second switching elements to output a second predetermined voltage higher than the first predetermined voltage as the output voltage in a second operation mode, and to switch the first operation mode to the second operation mode by performing the pulse-frequency-modulation control, increasing the output voltage from the first predetermined voltage to the second predetermined voltage, and switching the pulse-frequency-modulation control to the pulse-width-modulation control upon elapse of a first predetermined time after start of increase in the output voltage.

3. The switching regulator as described in claim 2, further comprising:
a dummy load configured to serve as a pseudo load through which a predetermined current flows;
wherein the control switching part is configured to connect the dummy load to the output terminal for a second predetermined time upon elapse of the first predetermined time.

4. The switching regulator as described in claim 2, wherein the control switching part comprises:
a pulse-width-modulation control circuit configured to perform the pulse-width-modulation control over the first switching element;
a pulse-frequency-modulation control circuit configured to perform the pulse-frequency-modulation control over the second switching element;
a switching circuit configured to control output of the second control signal from the pulse-frequency-modulation control circuit and the first control signal from the pulse-width-modulation control circuit to the control electrode of the second switching element; and
a control circuit configured to stop, in the first operation mode, operation of the pulse-width-modulation control circuit and cause the switching circuit to exclusively output the second control signal from the pulse-frequency-modulation control circuit to the second switching element, to operate, in the second operation mode, the pulse-width-modulation control circuit and cause the switching circuit to exclusively output the first control signal from the pulse-width-modulation control circuit to the second switching element, and to stop, in switching from the first operation mode to the second operation mode, the operation of the pulse-width-modulation control circuit, increase the output voltage from the first predetermined voltage to the second predetermined voltage while causing the switching circuit to exclusively output the second control signal from the pulse-frequency-modulation control circuit to the second switching element, and operate the pulse-width-modulation control circuit and cause the switching circuit to exclusively output the first control signal from the pulse-width-modulation control circuit to the second switching element upon elapse of the first predetermined time after the start of increase in the output voltage.

5. The switching regulator as described in claim 4, further comprising:
a dummy load configured to serve as a pseudo load through which a predetermined current flows;
wherein the control circuit is configured to connect the dummy load to the output terminal for a second predetermined time upon elapse of the first predetermined time.

6. The switching regulator as described in claim 2, wherein a current flowing through the external load is smaller in amount in the first operation mode than in the second operation mode.

7. The switching regulator as described in claim 2, wherein the control switching part extends the first predetermined time as a voltage difference between the first and second predetermined voltages increases.

8. The switching regulator as described in claim 5, wherein the first and second switching elements, the pulse-frequency-modulation control circuit, the pulse-width-modulation control circuit, the switching circuit, and the dummy load are integrated into a single integrated circuit.

9. A switching regulating method comprising:
providing a control switching part and two switching elements, one of the two switching elements being larger in ON-resistance and smaller in control electrode capacitance than the other of the two switching elements;
causing each of the two switching elements to perform a switching operation in accordance with a control signal input therein to control output of an output voltage;
causing, in a first operation mode, the control switching part to perform pulse-frequency-modulation control over the one of the two switching elements to output a first predetermined voltage;
causing, in a second operation mode, the control switching part to perform pulse-width-modulation control over the two switching elements to output a second predetermined voltage higher than the first predetermined voltage; and
causing, in switching from the first operation mode to the second operation mode, the control switching part to perform the pulse-frequency-modulation control, increase the output voltage from the first predetermined voltage to the second predetermined voltage, and switch the pulse-frequency-modulation control to the pulse-width-modulation control upon elapse of a first predetermined time after start of increase in the output voltage.

10. A switching regulating method comprising:
providing an input terminal configured to receive an input voltage, and an output terminal configured to output a predetermined constant voltage as an output voltage to an external load;
providing a control switching part and first and second switching elements, the second switching element being larger in ON-resistance and smaller in control electrode capacitance than the first switching element;
causing the first switching element to perform a switching operation in accordance with a first control signal input in a control electrode thereof to control output of the output voltage;
causing the second switching element to perform a switching operation in accordance with a second control signal input in a control electrode thereof to control output of the output voltage;
causing the control switching part to perform, in a first operation mode, the pulse-frequency-modulation control over the second switching element to output a first predetermined voltage as the output voltage;
causing the control switching part to perform, in a second operation mode, the pulse-width-modulation control over the first and second switching elements to output a second predetermined voltage higher than the first predetermined voltage as the output voltage; and causing the control switching part to perform, in switching from the first operation mode to the second operation mode, the pulse-frequency-modulation control, increase the output voltage from the first predetermined voltage to the second predetermined voltage, and switch the pulse-frequency-modulation control to the pulse-width-modulation control upon elapse of a first predetermined time after start of increase in the output voltage.

11. The switching regulating method as described in claim 10, further comprising:
providing a dummy load configured to serve as a pseudo load through which a predetermined current flows; and
causing the control switching part to connect the dummy load to the output terminal for a second predetermined time upon elapse of the first predetermined time.

12. The switching regulating method as described in claim 10, further comprising;
forming the control switching part with a pulse-width-modulation control circuit, a pulse-frequency-modulation control circuit, a switching circuit, and a control circuit;
causing the pulse-width-modulation control circuit to perform the pulse-width-modulation control over the first switching element;
causing the pulse-frequency-modulation control circuit to perform the pulse-frequency-modulation control over the second switching element;
causing the switching circuit to control output of the second control signal from the pulse-frequency-modulation control circuit and the first control signal from the pulse-width-modulation control circuit to the control electrode of the second switching element;
causing the control circuit, in the first operation mode, to stop operation of the pulse-width-modulation control circuit and cause the switching circuit to exclusively output the second control signal from the pulse-frequency-modulation control circuit to the second switching element;
causing the control circuit, in the second operation mode, to operate the pulse-width-modulation control circuit and cause the switching circuit to exclusively output the first control signal from the pulse-width-modulation control circuit to the second switching element, and
causing the control circuit, in switching from the first operation mode to the second operation mode, to stop the operation of the pulse-width-modulation control circuit, increase the output voltage from the first predetermined voltage to the second predetermined voltage while causing the switching circuit to exclusively output the second control signal from the pulse-frequency-modulation control circuit to the second switching element, and operate the pulse-width-modulation control circuit and cause the switching circuit to exclusively output the first control signal from the pulse-width-modulation control circuit to the second switching element upon elapse of the first predetermined time after the start of increase in the output voltage.

13. The switching regulating method as described in claim 12, further comprising:
providing a dummy load configured to serve as a pseudo load through which a predetermined current flows; and
causing the control circuit to connect the dummy load to the output terminal for a second predetermined time upon elapse of the first predetermined time.

14. The switching regulating method as described in claim 10, further comprising:
making an amount of a current flowing through the external load smaller in the first operation mode than in the second operation mode.

15. The switching regulating method as described in claim 10, further comprising:
causing the control switching part to extend the first predetermined time as a voltage difference between the first and second predetermined voltages increases.

16. The switching regulating method as described in claim 13, further comprising:
integrating the first and second switching elements, the pulse-frequency-modulation control circuit, the pulse-width-modulation control circuit, the switching circuit, and the dummy load into a single integrated circuit.

* * * * *